United States Patent

Kondo et al.

[11] Patent Number: 5,279,718
[45] Date of Patent: Jan. 18, 1994

[54] METHOD OF ELECTROOSMOTICALLY DEHYDRATING SLUDGE

[75] Inventors: Shiro Kondo, Hyogo; Shigeru Sano, Nara, both of Japan

[73] Assignee: Shinko Pantec Co., Ltd., Hyogo, Japan

[21] Appl. No.: 887,296

[22] Filed: May 22, 1992

[30] Foreign Application Priority Data

Jun. 26, 1991 [JP] Japan .................................. 3-154539

[51] Int. Cl.$^5$ .............................. C02F 1/00; B03C 5/00
[52] U.S. Cl. .................. 204/149; 204/180.1; 204/182.2; 204/301
[58] Field of Search .................. 204/149, 180.1, 182.2, 204/301, 299 R

[56] References Cited

U.S. PATENT DOCUMENTS

| | | | |
|---|---|---|---|
| 3,901,804 | 8/1975 | Ohuchi et al. | 210/721 |
| 4,118,319 | 10/1978 | Miyanohara et al. | 210/724 |
| 4,183,807 | 1/1980 | Yoshizawa et al. | 210/626 |
| 4,201,668 | 5/1980 | Miyanohara et al. | 210/724 |
| 4,919,775 | 4/1990 | Ishigaki | 204/149 |
| 5,034,111 | 7/1991 | Kondo et al. | 204/300 R |
| 5,092,974 | 3/1992 | Kondo et al. | 204/182.2 |

FOREIGN PATENT DOCUMENTS

| | | |
|---|---|---|
| 384081A2 | 8/1990 | European Pat. Off. . |
| 449358 | 10/1912 | France . |
| 55028715 | 2/1980 | Japan . |
| 58122085 | 7/1983 | Japan . |
| 1090100 | 4/1989 | Japan . |
| 2180700 | 7/1990 | Japan . |

OTHER PUBLICATIONS

Water Science Tech., vol. 22, No. 12, Kondoh et al., pp. 259–268 (1990).
Super Filtron Brochure by Shinko Pantec. (1989).
Wat. Sci. Tech., vol. 22, No. 12, Kondoh et al., pp. 259–268 (1990).

*Primary Examiner*—John Niebling
*Assistant Examiner*—Arun S. Phasge
*Attorney, Agent, or Firm*—Marshall, O'Toole, Gerstein, Murray & Borun

[57] ABSTRACT

This disclosure relates to a process and apparatus for electroosmotic dehydration of sludge with aluminum salt added to the sludge to reduce the clogging of the filter cloths of the dehydrator, and to improve the cake release. The aluminum salt is preferably polyaluminum chloride.

2 Claims, 2 Drawing Sheets

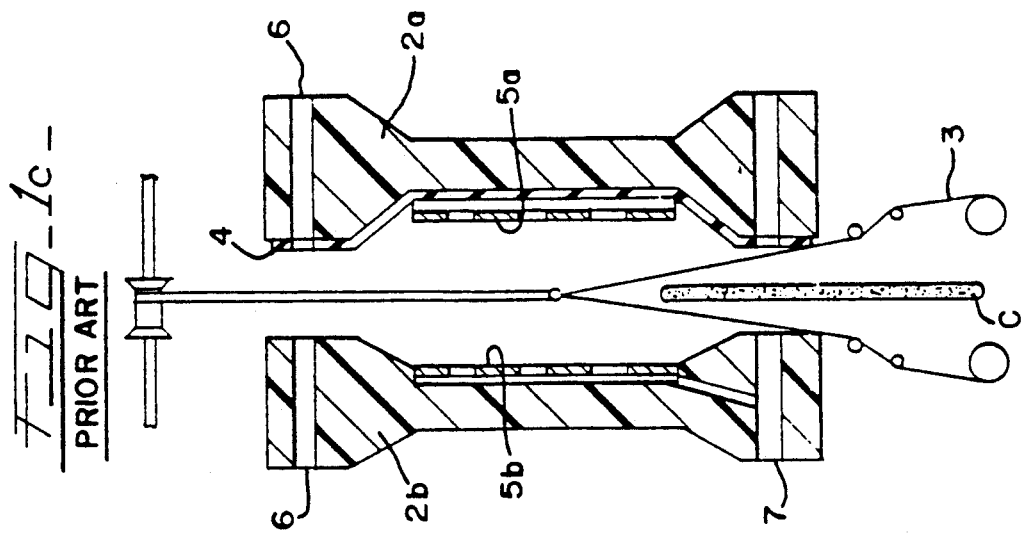
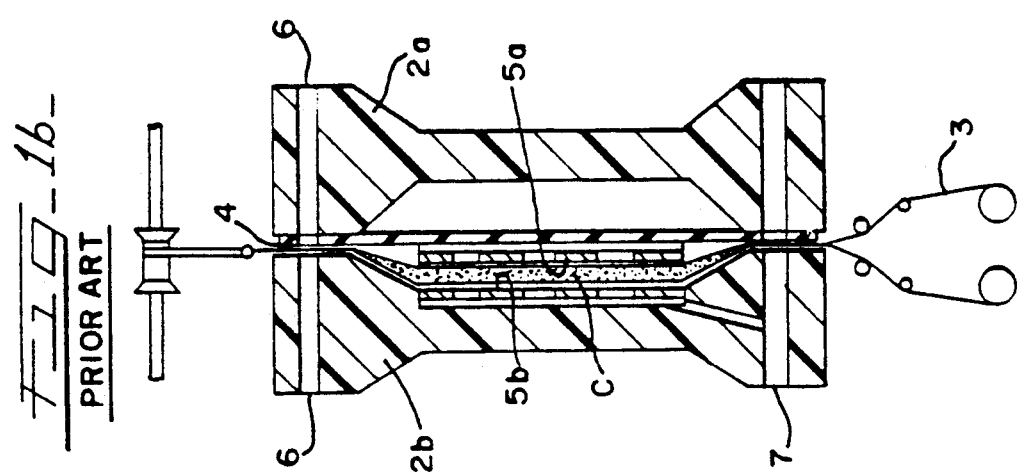
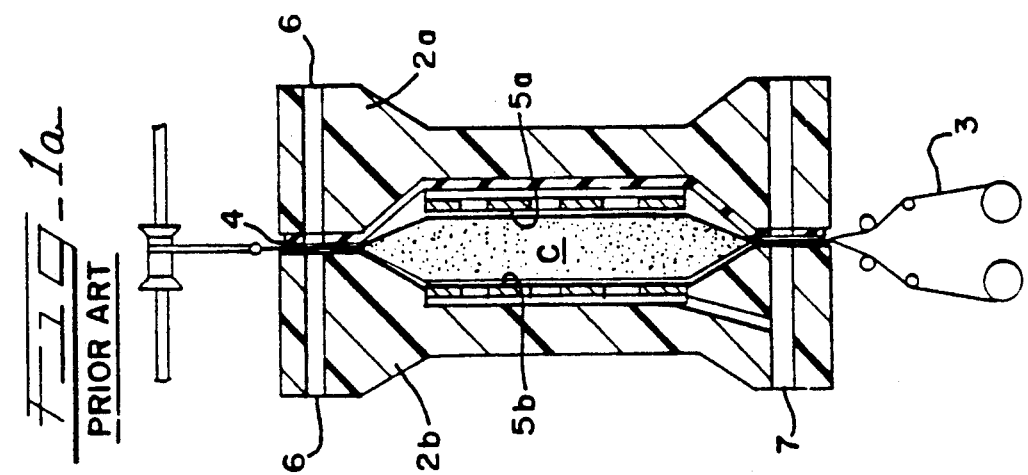

METHOD OF ELECTROOSMOTICALLY DEHYDRATING SLUDGE

FIELD AND BACKGROUND OF THE INVENTION

This invention relates to a method of electroosmotically dehydrating sludge produced in processing service water, sewage or various types of industrial sewage. More particularly, the invention relates to such a method using a filter press.

The particles of sludge contained in service water sludge and sewage sludge, for example, are electrically negatively charged, while the water contained in the sludge is positively charged. In the dehydration method known as electroosmotic dehydration, the water contained in sludge moves electroosmotically toward a cathode, and the salt contained in the sludge is electrolyzed, so that the filtrate is acid on the anode side and alkaline on the cathode side.

Generally, metal ions precipitate as insoluble metal hydroxide on the alkaline side, and the precipitate sticks to the electrode surfaces and filter cloths on the cathode side and disadvantageously affects the electroosmotic dehydration. This can be prevented by a method of reversing the polarity of the electrodes for a few minutes at the last step, or for every several batches, of electroosmotic dehydration, in order for the acid filtrate to dissolve and remove the precipitate.

U.S. Pat. No. 5,092,974 dated Mar. 3, 1992 to Kondo et al. describes a process for compressive (pressurized) and electroosmotic dehydration using carbonaceous electrodes which contain carbon fibers, and the polarity of which is reversed during the dehydration process.

However, depending on the type of sludge, the reversal of polarity may not recover the blinded or clogged filter cloths. In particular, sludge containing a large amount of calcium blinds the filter cloths in a short time, so that the dehydration and the sludge cake release from the cloths may deteriorate.

When the liquid pH is 13 or higher near the cathode, $Ca^{++}$ ions having moved together with the liquid to the cathode side, and $OH^-$ ions produced on the cathode surfaces, are bound together to precipitate as insoluble calcium hydroxide $[Ca(OH)_2]$ in the filter cloth fibers. This disadvantageously affects the filtering speed and the cake release.

SUMMARY OF THE INVENTION

This invention is characterized by electroosmotic dehydration with aluminum salt added to sludge to reduce the clogging of the filter cloths of the dehydrator, and to improve the cake release. The aluminum salt is preferably polyaluminum chloride.

Because aluminum has a less tendency to be ionized than calcium, the addition of aluminum salt to sludge to be dehydrated gives priority to $Al^{3+}$ ions being bound to $OH^-$ ions to precipitate aluminum hydroxide $[Al(OH)_3]$, while calcium is discharged as still being $Ca^{2+}$ ions together with the filtrate, so that a reduced amount of calcium hydroxide $[Ca(OH)_2]$ is produced.

The aluminum hydroxide is dissolved again when the filtrate pH is 10 or higher and discharged with the filtrate, thus reducing the precipitate on the cathode side and preventing the clogging of filter cloths on this side.

BRIEF DESCRIPTION OF THE DRAWINGS

A preferred embodiment of the invention is described below with reference to the accompanying drawings, wherein:

FIGS. 1a, 1b and 1c are schematic partial views in cross section of a pressurized electroosmotic dehydrator, showing steps of prior art sludge dehydration;

DETAILED DESCRIPTION OF THE INVENTION

Figure 2:
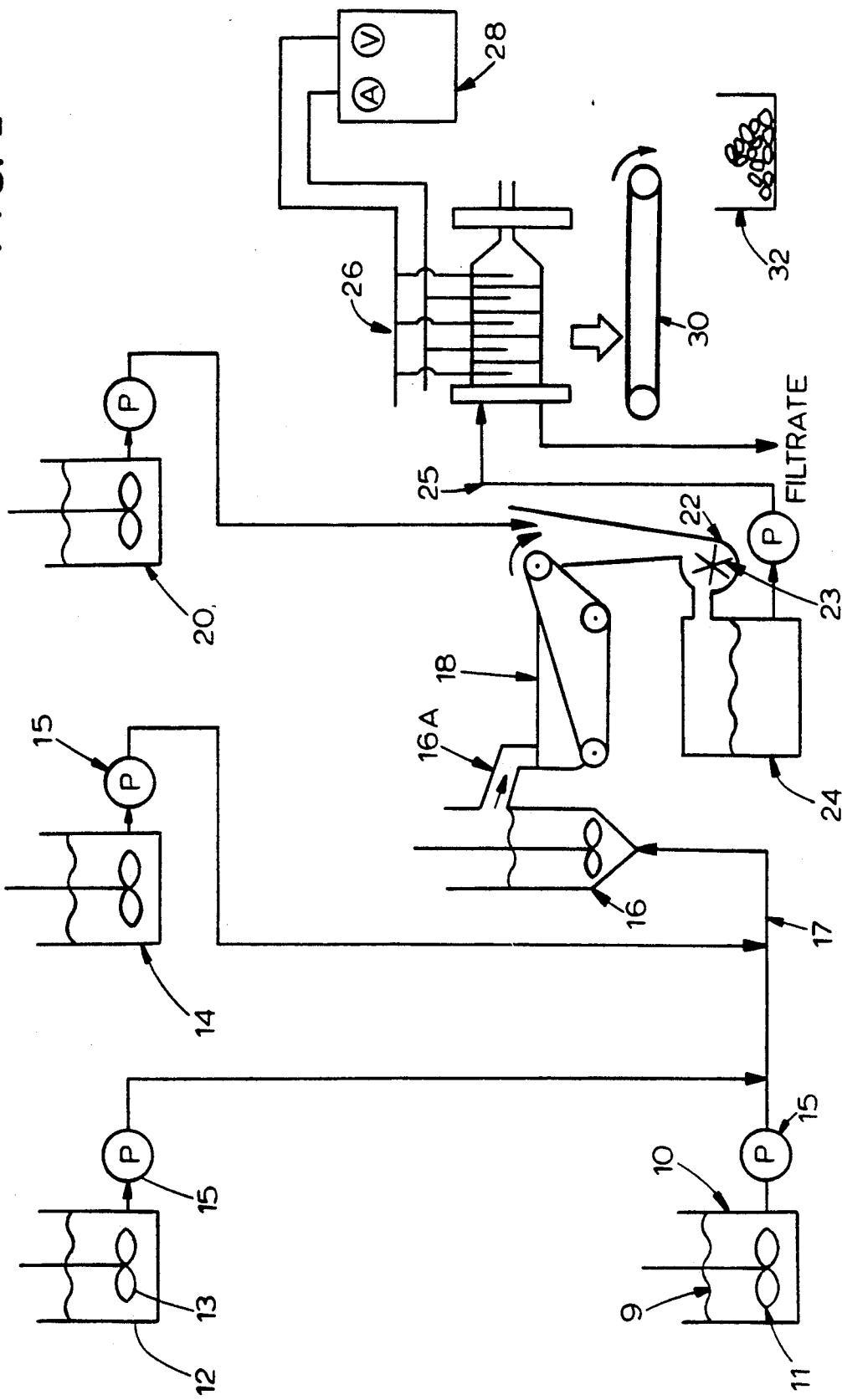
FIG. 2 is a flow diagram of a sludge dehydration process according to the invention.

With reference to FIG. 2, sludge 9 to be dehydrated is fed into a sludge tank 10 and stirred in it by a rotatable paddle or propeller 11. Similar stirrers are provided in other tanks of the system.

Perlite is mixed by a paddle 13 with water in a separate perlite tank 12. Perlite is added to the sludge to facilitate the dehydration of the sludge and the release of the resultant cake from the filter cloths of a pressurized electroosmotic dehydrator, as will be explained later.

Polyalkylmetacrylate as polymer is mixed with water in a polymer tank 14. Polymer is added to the sludge to coagulate the sludge into flocks to facilitate the succeeding screening of the sludge.

The sludge, the dilute perlite and the polymer are pumped by pumps to a common line 17 and to a coagulating and mixing tank 16, where they are mixed together and the sludge is coagulated. the coagulated sludge is fed through a conduit 16a to a predehydrator 18, where it is screened in order to concentrate it.

Polyaluminum chloride as aluminum salt is stirred in a "PAC" tank 20. The aluminum salt is pumped to a mixer 22 along with the screened sludge from the predehydrator screen 18, and in which the sludge and aluminum salt are mixed together by a paddle 23. The mixed sludge is fed to a concentrated sludge tank 24, from which it is pumped through a line 25 to a pressurized electroosmotic dehydrator 26.

The dehydrator 26 has a construction substantially as described in U.S. Pat. No. 5,034,111 dated Jul. 23, 1991 to Kondo et al. and illustrated in FIGS. 1a, 1b and 1c herein. The dehydrator 26 is connected to a DC power source 28. The sludge cake is discharged from the dehydrator 26 onto a conveyor 30, which conveys it to a cake container 32.

The dehydrator 26 processes the sludge substantially in the same manner as by the conventional process shown in FIGS. 1a-1c. With reference to FIG. 1a, the sludge C is forced through the feed bores 6 into the closed space formed between the press plates 2a and 2b and surrounded by the two filter cloths 3, and it is dehydrated by the squeezing pressure. The filtrate is discharged from the machine through the discharge bores 7.

With reference to FIG. 1b, compressed air is supplied to expand the diaphragm 4 on the press plate 2a toward the opposite plate 2b to create pressurized dehydration. Then, DC voltage is applied between the porous electrode plates 5a and 5b on the diaphragm 4 and press plate 2b, respectively, to make electroosmotic dehydration.

With reference to FIG. 1c, after the electroosmotic dehydration, the press plates 2a and 2b are opened, and the filter cloths 3 are lowered to discharge the sludge cake C.

Comparative tests have been carried out using the system of FIG. 2 for a mixture of the same weight of raw sludge and excess activated sludge, which were produced in a sewage plant. The dehydrator 26 had a filtering area of 2.1 m$^2$.

The mixed sludge initially had a concentration of 3.42 wt. % and 34,200 mg/l of suspended solids.

The mixed sludge was mixed with perlite having a concentration of 5 wt. % in an amount of 15.37 wt. % of the total solids of the sludge, and with polyalkylmetacrylate having a concentration of 0.2 wt. % in an amount of 0.52 wt. % of the total sludge solids.

The pressure for squeezing the sludge into the dehydrator 26 was 4 kg/cm$^2$. The pressure by each pressurized diaphragm of this dehydrator was 4 kg/cm$^2$.

The DC voltage between the electrodes was 40 V. Initially, the electrode plate on each diaphragm was the anode.

The other conditions and results were as follows:

Example 1

13.75 liters of the mixed sludge mixed with the perlite and polymer were squeezed into the closed space between each pair of the press plates of the dehydrator for 15 minutes.

In 5 minutes after the compression started, the voltage was applied for 66 minutes until the sludge cake had a concentration of 35 wt. % (water content of 65 wt. %).

The voltage application was continued with the polarity reversed for 2 minutes.

The filtering speed was 1.23 kgDS/m$^2$h (DS: dry solids). The consumed electric energy was 0.88 kWh/kgDS.

Example 2

The mixed sludge mixed with the perlite and polymer was further mixed with polyaluminum chloride having a concentration of 10 wt. % in an amount of 1.11 wt. % of the total sludge solids.

13.75 liters of the resultant sludge were squeezed into the closed space of the dehydrator for 15 minutes.

In 5 minutes after the compression started, the voltage was applied for 27 minutes until the cake had the concentration of 35 wt. %. This period is much shorter than in Example 1. The voltage application was continued with the polarity reversed for 2 minutes.

The filtering speed was 2.34 kgDS/m$^2$h, which is much higher than in Example 1. The consumed electric energy was 0.43 kWh/kgDS, which is much lower than in Example 1. The cake release was much better than in Example 1.

For a mixture of the same weight of raw sludge and excess activated sludge, the amount of added polyaluminum chloride should be 0.7-1.5 wt. %. For raw sludge only, this amount should be 0.3-1.0 wt. %. For excess activated sludge only, this amount should be 1.0-2.0 wt. %.

It should be noted that aluminum sulfate, although it is aluminum salt, is not desirable if the electrodes are carbonaceous, because it causes corrosion. Also, any metal salt (such as iron salt) other than aluminum salt is not effective because the hydroxide is not dissolved again on the alkaline side.

As stated above, according to the present invention, the addition of aluminum salt to sludge reduces considerably the blinding or clogging of the filter cloths, improves the filtration, saves the amount of consumed electric power and improves the cake release. This stabilizes the dehydration for a long time, in combination with the polarity reversal of the electrode plates to dissolve and remove precipitate on the electrode surfaces.

What is claimed is:

1. A method of electroosmotically dehydrating sludge surrounded by a filter cloth between a pair of electrodes, the sludge containing calcium, the method comprising the steps of mixing an organic polymer with said sludge and thereby coagulating said sludge and producing coagulated sludge; mixing said coagulated sludge with aluminum salt and producing a mixed sludge, and dehydrating said mixed sludge by applying DC voltage between the electrodes, and further comprising the step of predehydrating said coagulated sludge between said step of producing said coagulated sludge and said step of mixing said coagulated sludge with aluminum salt.

2. A method of electroosmotically dehydrating sludge surrounded by a filter cloth between a pair of electrodes, the sludge containing calcium, the method comprising the steps of mixing an organic polymer with said sludge and thereby coagulating said sludge and producing coagulated sludge; mixing said coagulated sludge with aluminum salt and producing a mixed sludge, and dehydrating said mixed sludge by applying DC voltage between the electrodes, said aluminum salt comprising polyaluminum chloride, and further comprising the step of predehydrating said coagulated sludge between said step of producing said coagulated sludge and said step of mixing said coagulated sludge with aluminum salt.

* * * * *